US012627600B2

(12) United States Patent
Carlinet et al.

(10) Patent No.: US 12,627,600 B2
(45) Date of Patent: May 12, 2026

(54) METHOD AND SYSTEM FOR CONFIGURING AN AUTONOMOUS SYSTEM

(71) Applicant: Orange, Issy-les-Moulineaux (FR)

(72) Inventors: Yannick Carlinet, Chatillon (FR); Eric Gourdin, Chatillon (FR); Nancy Perrot, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 190 days.

(21) Appl. No.: 18/661,136

(22) Filed: May 10, 2024

(65) Prior Publication Data

US 2024/0380691 A1 Nov. 14, 2024

(30) Foreign Application Priority Data

May 12, 2023 (FR) ...................................... 2304720

(51) Int. Cl.
| | |
|---|---|
| *H04L 45/42* | (2022.01) |
| *H04L 45/00* | (2022.01) |
| *H04L 45/12* | (2022.01) |
| *H04L 45/58* | (2022.01) |
| *H04L 45/74* | (2022.01) |

(52) U.S. Cl.
CPC .............. *H04L 45/54* (2013.01); *H04L 45/58* (2013.01); *H04L 45/74* (2013.01)

(58) Field of Classification Search
None
See application file for complete search history.

(56) References Cited

U.S. PATENT DOCUMENTS

| | | | | |
|---|---|---|---|---|
| 6,526,056 B1 * | 2/2003 | Rekhter | ................. | H04L 45/50 |
| | | | | 370/392 |
| 8,098,578 B1 * | 1/2012 | Shah | ...................... | H04L 41/00 |
| | | | | 370/230 |

(Continued)

FOREIGN PATENT DOCUMENTS

| | | | | |
|---|---|---|---|---|
| CN | 102571557 A | * | 7/2012 | ............. H04L 45/02 |
| CN | 115941593 B | * | 4/2025 | ............. H04L 41/40 |

OTHER PUBLICATIONS

French Search Report and Written Opinion dated Jan. 12, 2024 for Application No. 2304720.

(Continued)

*Primary Examiner* — Christopher B Robinson
(74) *Attorney, Agent, or Firm* — Knobbe, Martens, Olson & Bear, LLP

(57) ABSTRACT

A method for configuring a first autonomous system in a transit network is described. The method includes obtaining information according to which the traffic received by an ingress router of the first autonomous system is saturated, and determining a prefix of a destination subnet of a third autonomous system downstream of the first autonomous system. The method also includes extending the path associated with the prefix on at least one target router of the first autonomous system, the prefix and the at least one target router being determined by optimizing an objective function so that the path associated with the prefix must be extended for all the ingress routers of the first autonomous system which are geographically closer to the saturated router than the target router.

7 Claims, 1 Drawing Sheet

(56)  References Cited

U.S. PATENT DOCUMENTS

| | | | |
|---|---|---|---|
| 2006/0171331 A1* | 8/2006 | Previdi | ................. H04L 45/026 |
| | | | 370/254 |
| 2006/0198321 A1* | 9/2006 | Nadeau | ................... H04L 45/50 |
| | | | 370/254 |
| 2007/0217419 A1* | 9/2007 | Vasseur | ................... H04L 45/24 |
| | | | 370/392 |
| 2008/0062891 A1* | 3/2008 | Van der Merwe | ...... H04L 45/42 |
| | | | 370/254 |
| 2014/0036663 A1* | 2/2014 | Narayanan | ............. H04L 45/04 |
| | | | 370/230 |
| 2020/0007435 A1 | 1/2020 | Paida et al. | |
| 2022/0321477 A1 | 10/2022 | Lambert et al. | |

OTHER PUBLICATIONS

Gao Ruomei et al: "Interdomain Ingress Traffic Engineering Through Optimized AS-Path Prepending", Networking 2005. Networking Technologies, Services, and Protocols; Performance of Computer and Communication Networks; Mobile and Wireless Communications Systems, [Online] vol. 3462, May 2, 2005 (May 2, 2005), pp. 647-658, XP047304686, Lecture Notes in Computer Science DOI: 10.1007/11422778_52 ISBN: 978-3-540-32017-3 Extrait de l'Internet: URL:https://link.springer.com/content/pdf/10.1007/11422778_52. pdf>.

* cited by examiner

[Fig. 1]
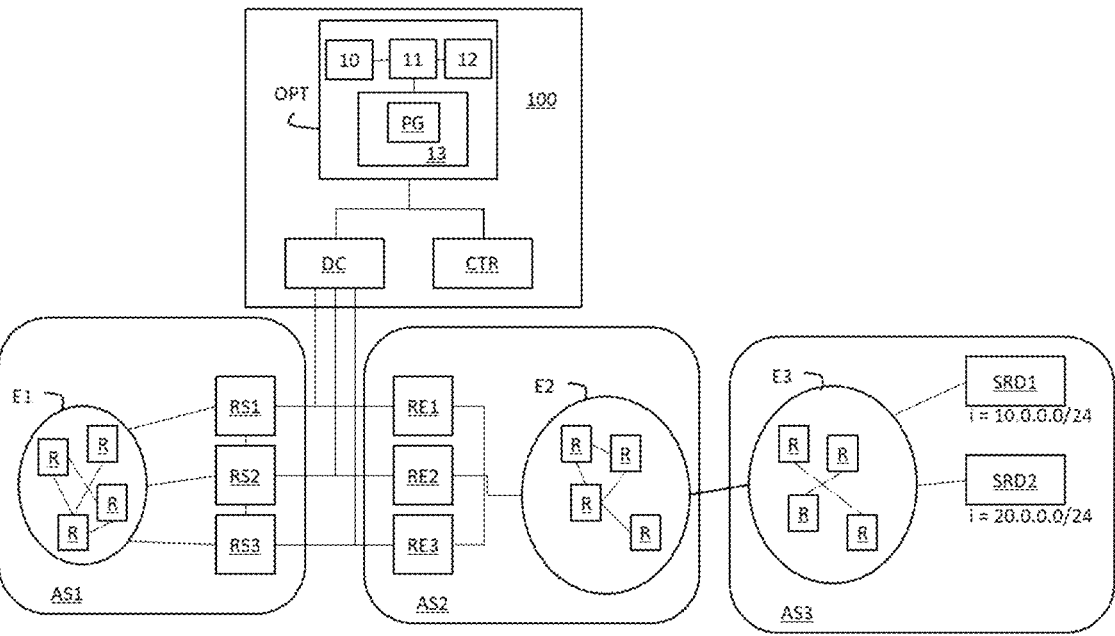
[Fig. 2]
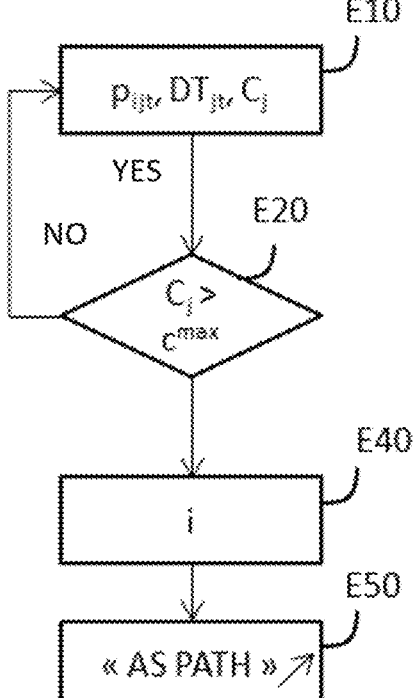

METHOD AND SYSTEM FOR CONFIGURING AN AUTONOMOUS SYSTEM

TECHNICAL FIELD

The disclosed technology is in the context of a transit network. It more particularly relates to a method and a system making it possible to rebalance the load in an Autonomous System (AS) when it is detected that one of its input interfaces is saturated.

DISCUSSION OF RELATED TECHNOLOGY

Equivalently, the expressions "input interface" or "ingress router" will be used.

In certain implementations, such an ingress router receives, from one or more egress routers of an autonomous system called "upstream" autonomous system, traffic including packets, and routes each of these packets, from their destination IP address to a destination subnet of an autonomous system called "downstream" autonomous system.

It is recalled that the IP addresses of the equipment in the same destination subnet belong to the same address range called "prefix".

It is also recalled that these transit networks use the BGP protocol (Border Gateway Protocol) to exchange network routing and accessibility information (called prefixes) between the autonomous systems.

The BGP protocol in particular defines an eBGP (Exterior BGP) operating mode used between two autonomous systems AS. This protocol defines messages, each associated with a certain number of attributes.

For example, once the eBGP connection has been established between the ingress router of a first autonomous system and an egress router of a second upstream autonomous system, the ingress router communicates to the egress router:

information on the destination networks it knows and for which it proposes transit, as well as
  a certain number of attributes associated with these networks, which make it possible to avoid loops. It is up to the egress routers of the second upstream autonomous system to choose an ingress router of the first autonomous system which offers the best route to a destination subnet.

Particularly, when several routes are possible to the same destination subnet, the BGP protocol allows a router to determine the best route to be used and to announce it to its neighboring routers.

For this purpose, the protocol defines an "AS Path" attribute which includes an ordered list of the autonomous systems traversed to reach a destination subnet. Other things being equal, the BGP protocol chooses the route with the shortest "AS Path" attribute.

It is common for some input interfaces to be saturated but not for others.

In the current state of the art, a solution to try to get out of this saturation situation consists in reconfiguring the saturated ingress router by increasing the list of the "AS Path" attribute associated with a destination subnet, in other words with a prefix. The egress routers of the second upstream autonomous system then move the traffic destined for this prefix towards another ingress router.

But the large number of prefixes as well as the combinatorics related to the nature of the problem make it very difficult to choose the prefixes whose paths must be extended. Indeed, a chosen prefix can cause saturation on an ingress router; it is then necessary to choose new prefixes on this last ingress router, which can lead to new saturations elsewhere, and so on.

The disclosed technology aims a configuration method and system that does not present these drawbacks.

SUMMARY

Thus, and according to a first aspect, the disclosed technology relates to a method for configuring a first autonomous system in a transit network, this method including:

a step of obtaining information according to which the traffic received by an ingress router of the first autonomous system is saturated, said traffic being received from at least one egress router of a second autonomous system upstream of said first autonomous system;

a step of determining a prefix of a destination subnet of a third autonomous system downstream of said first autonomous system, at least part of said traffic being destined for equipment of said destination subnet;

a step of extending the path associated with said prefix on at least one target router among the ingress routers of said first autonomous system;

said prefix and said at least one target router being determined by optimizing an objective function in compliance with at least these constraints, according to which:

(i) for any ingress router of the first autonomous system, the traffic at the input of said router is below a saturation threshold; and (ii) the path associated with said prefix must be extended for all the ingress routers of the first autonomous system which are geographically closer to the saturated router than said target router.

Correlatively, the disclosed technology relates to a system for configuring a first autonomous system in a transit network, this system including:

an optimization unit configured to obtain information according to which the traffic received by an ingress router of a first autonomous system is saturated, said traffic being received from at least one egress router of a second autonomous system upstream of said first autonomous system;

said optimization unit being configured to determine a prefix of a destination subnet of a third autonomous system downstream of said first autonomous system, at least part of said traffic being destined for equipment of said destination subnet;

a control unit configured to extend the path associated with said prefix on at least one target router among the ingress routers of said first autonomous system;

said prefix and said at least one target router being determined by said optimization unit by optimizing an objective function in compliance with at least these constraints, according to which:

(i) for any ingress router of the first autonomous system, the traffic at the input of said router is below a saturation threshold; and (ii) the path associated with said prefix must be extended for all the ingress routers of the first autonomous system which are geographically closer to the saturated router than said target router.

In accordance with the second constraint, the path associated with the determined prefix is at least extended on the saturated router and possibly on at least one other target router. The disclosed technology assumes that the extension of a path associated with a prefix on a given router has the effect that the egress routers of the second upstream autonomous system move the traffic associated with this prefix towards the interface geographically closest to this given router, this displacement having the effect of load rebalancing within the first autonomous system.

In accordance with the disclosed technology, the prefix is determined by optimizing an objective function in compliance with the constraints, a constraint imposing that the path associated with the prefix must be extended for all the ingress routers of the first autonomous system which are geographically closer to the saturated router than the target router.

In one particular embodiment, the extension of the path associated with the prefix on at least one said target router includes:

a reconfiguration of a routing table of the target router by adding at least one autonomous system to an AS-Path attribute of the BGP protocol; and a sending of said attribute to at least one egress router of said second upstream autonomous system.

In one embodiment of the disclosed technology, the optimization of the objective function consists in minimizing the number of ingress routers to be reconfigured.

In other embodiments of the disclosed technology, the optimization of the objective function can for example consist in minimizing the number of prefixes whose path is extended, or in minimizing the load of the most loaded interface.

The objective function can also be a linear combination of one or more of these optimization functions (minimization of the number of routers, of the number of prefixes whose path is extended, of the load of the most loaded interface, . . .).

In one embodiment:

the objective function is a linear function of the form: Min $\Sigma_{j \in J} z_j$ and the constraints are expressed linearly in the form:

| | |
|---|---|
| CST1: $\Sigma_{k \in J} x_{ijk} = 1$ | $\forall i \in I, \forall j \in J$ |
| CST2: $x_{ijk} + y_{ik} \leq 1$ | $\forall i \in I, \forall j \in J, \forall k \in J$ |
| CST3: $x_{ijk} \leq y_{il}$ | $\forall i \in I, \forall j \in J, \forall k \in J, \forall l \in L(j, k)$ |
| CST4: $\Sigma_{i \in J} \Sigma_{j \in J} p_{ijt} x_{ijk} \leq c^{max} b_k$ | $\forall k \in J, \forall t \in T$ |
| CST5: $y_{ij} \leq z_j$ | $\forall i \in I, \forall j \in J$ | in which:

$c^{max}$ is a saturation threshold and $b_j$ is the maximum throughput supported by the router REj;

$p_{ijt}$ is a peak traffic associated with the prefix i on the interface j over a time range t;

Lj is an ordered list of the ingress routers of the first autonomous system from closest to the farthest from the saturated router REj;

L(j,k) is a sub-list of Lj comprising the ingress routers of the first autonomous system (AS2) which are geographically closer to the saturated router (REj) than said target router (REk);

$x_{ijk}$ is a binary decision variable equal to 1 if the traffic associated with the prefix i is routed from a router REi to a router REj, 0 if not;

$y_{ij}$ is a binary decision variable equal to 1 if the path associated with the prefix i is extended on an ingress router REj, 0 if not;

$z_j$ is binary decision variable equal to 1 if the ingress router REi is reconfigured, 0 if not.

In this embodiment, the method implements an integer linear program (ILP), particularly suitable for the optimization problems with high combinatorics, the ILP being solved in order to obtain a solution that offers a guarantee of optimality on the number of routers to be reconfigured.

The disclosed technology also relates to a computer program including instructions for executing the following steps when said program is executed by a computer.

obtaining information according to which the traffic received by an ingress router of a first autonomous system is saturated, said traffic being received from at least one egress router of a second autonomous system upstream of said first autonomous system;

determining a prefix of a destination subnet of a third autonomous system downstream of said first autonomous system, at least part of said traffic being destined for equipment of said destination subnet;

sending an instruction to extend the path associated with said prefix on at least one target router among the ingress routers of said first autonomous system;

said prefix and said at least one target router being determined by optimizing an objective function in compliance with at least these constraints, according to which:

(i) for any ingress router of the first autonomous system, the traffic at the input of said router is below a saturation threshold; and (ii) the path associated with said prefix must be extended for all the ingress routers of the first autonomous system which are geographically closer to the saturated router than said target router.

This program can use any programming language, and be in the form of source code, object code, or intermediate code between source code and object code, such as in a partially compiled form, or in any other desirable form.

The disclosed technology also relates to a computer-readable information medium, and including instructions for a computer program as mentioned above. The information medium can be any entity or device capable of storing the program. For example, the medium can include a storage means, such as a ROM, a non-volatile memory of the flash type or a magnetic recording means, for example a hard disk. On the other hand, the information medium can be a transmissible medium such as an electrical or optical signal, which can be conveyed via an electrical or optical cable, by radio or by other means. The program according to the disclosed technology can be particularly downloaded onto an Internet type network. Alternatively, the information medium can be an integrated circuit in which the program is incorporated, the circuit being adapted to execute or to be used in executing the method in question.

BRIEF DESCRIPTION OF THE DRAWINGS

Other characteristics and advantages of the disclosed technology will emerge from the description given below, with reference to the appended drawings which illustrate exemplary embodiments devoid of any limitation.

FIG. 1 illustrates one exemplary implementation of a load balancing system in accordance with one particular embodiment of the disclosed technology.

FIG. 2 represents the main steps of a configuration method system in accordance with one embodiment of the disclosed technology.

DETAILED DESCRIPTION

FIG. 1 illustrates in detail one exemplary implementation of a load balancing system 100 in accordance with the disclosed technology.

In the embodiment described here, the load balancing system 100 includes a collection unit DC, an optimization OPT unit and a controller CTR.

In the embodiment of FIG. 1, these three entities are separated. As a variant, at least two of them can be integrated into the same equipment. They can be co-located or linked together by a network of any nature.

In the example described here, a first autonomous system AS1 includes three egress routers RS1, RS2, RS3, and a second autonomous system AS2, upstream of the first autonomous system AS1, includes three ingress routers RE1, RE2, RE3.

In the example described here, each egress router RSi is connected with the ingress router REi (of the same index).

Moreover, in the example of FIG. 1, the egress router RS1 is connected within the autonomous system AS1 to the egress router AS2, itself connected to the egress router RS3. The egress router RS1 therefore has two possibilities to send a packet to the destination subnet SRD1:

either route this packet to the ingress router RE1, or route it to the egress router RS2, which can in turn either route it to the ingress router RE2, or to the egress router RS3, the latter then routing it to the ingress router RE3.

In the exemplary embodiment described here, it is assumed that the three ingress routers RE1, RE2, RE3 of the autonomous system AS2 are located respectively in Paris, London and Amsterdam.

In the example described here, the autonomous system AS3 includes two destination subnets SRD1, SRD2 and other destination subnets not represented.

Each of these autonomous systems ASi further includes a set Ei of routers R.

The addresses of the equipment of the same destination subnet have the same prefix.

For example:

the destination subnet SRD1 contains the IP address range 10.0.0.0 to 10.0.0.255, and its prefix can be noted 10.0.0.0/24; and the destination subnet SRD2 contains the IP address range 20.0.0.0 to 20.0.0.255, and its prefix can be noted 20.0.0.0/24.

In accordance with the BGP protocol, each ingress router of the first autonomous system AS2 manages a routing table, which comprises, for each destination subnet to which it can route traffic, an AS-Path attribute which lists the autonomous system(s) that a packet must go through to reach this subnet. For example, the routing table for the ingress router RE1 includes two records:

SRD1: AS-Path: AS2, AS3

SRD2: AS-Path: AS2, AS3

In accordance with the BGP protocol, the ingress router RE1 (respectively RE2, RE3) announces to the egress router RS1 (respectively RS2, and RS3) of the autonomous system AS1 that it is capable of routing the traffic to the destination subnets SRD1 and SRD2, this message including this information from its routing table, and in particular how far they are from each of these subnets. This distance is specific to the operation of the IP routing and does not correspond to a geographic distance. To distinguish it from a geographic distance, this distance will be called "routing distance".

For example, the ingress router RE1 sends to the egress router RS1 two messages of the type UPDATE (SRD1, AS2, AS3) and UPDATE (SRD2, AS2, AS3) to indicate that it can route traffic to the destination subnet SRD1 (respectively SRD2) and that it is at a routing distance of two autonomous systems (in this case AS2, AS3) from the destination subnet SRD1 (respectively SRD2).

In the exemplary embodiment described here, the ingress router RE2 (respectively RE3) makes the same announcements to the egress router RS2 (respectively RS3).

FIG. 2 represents the main steps of a configuration method in accordance with one embodiment of the disclosed technology.

The balancing method includes a general step E10 of collecting data representative of the traffic received as input by the ingress routers RE1, RE2, RE3 of the autonomous system AS2.

If the collection of the data cannot be done simultaneously on all the prefixes, it can be done in time slots in groups of prefixes.

In the embodiment described here, these data make it possible in particular to determine:

the peak throughput, in other words the maximum throughput, at the input of an ingress router during a time range; and the peak throughput corresponding to the packets of a destination subnet SRDi, in other words to the traffic associated with a given prefix over a time range.

In the exemplary implementation described here, two time ranges, i.e. for example the morning and the evening will be considered.

The notations used below are introduced using an example.

In the embodiment described here, 2 destination subnets SRD1, SRD2, noted SRDi, i.e. 2 prefixes $i=1$ to 2 are considered.

In the exemplary embodiment described here, the system includes 3 ingress routers RE1, RE2, RE3, in other words 3 interfaces $j=1$ to 3.

In the exemplary embodiment described here, 2 time ranges $t=1$ to 2 are considered.

$p_{ijt}$ denotes the peak traffic associated with the prefix i on the interface j during the time range t.

To illustrate the description, it is assumed that the nominal situation is that of table T1 in the Annex.

For example, for the router RE1, interface $j=1$, located in Paris:

the maximum throughput in the morning ($t=1$) to the subnet SDR1 (prefix $i=1$), noted $p_{111}$, is 3 Gbps;

the maximum throughput in the morning ($t=1$) to SDR2 ($i=2$), noted $p_{211}$, is 2 Gbps;

the maximum throughput in the evening ($t=2$) to SDR1 ($i=1$), noted $p_{112}$, is 6 Gbps;

the maximum throughput in the evening ($t=2$) to SDR2 ($i=2$), noted $p_{212}$, is 4 Gbps. $DT_{jt}$ denotes the maximum cumulative throughput on the interface j during the time range t.

Cj denotes the load on the interface j, defined as the ratio between the maximum throughput over one or more time ranges and the maximum throughput $b_j$ supported by this interface (assumed equal to 100 Gbps for all the interfaces below).

In the example of table T1, it is considered that the maximum throughput in the morning ($t=1$) at the input of the interface 1 (router RE1), noted $DT_{11}$, is 80 Gbps; and that in the evening, this maximum throughput is $DT_{12}=93$ Gbps. The load $C_1$ of the router RE1 is therefore 93%.

The configuration method includes a step E20 to determine whether the traffic at the input of an ingress router REj of the autonomous system AS2 is saturated. In the embodiment described here, this determination is made by comparing the load of the router REj with a saturation threshold $c^{max}$.

In the example described here, the saturation threshold $c^{max}$ is equal to 90%.

In the example of Table T1, the ingress router RE1 (or the interface 1) is determined to be saturated because C1 (93%) is greater than $c^{max}$.

When an ingress router REj is determined to be saturated, the result of the test E20 is positive.

The disclosed technology proposes to rebalance the load by extending the path associated with a prefix on this saturated router, the disclosed technology assuming that when an egress router of the autonomous system AS1 learns that the path associated with a prefix is extended on an ingress router REj, it moves the traffic associated with this prefix on the ingress router REk of the autonomous system AS2 geographically closest to REj.

Table TD in the annex presents the geographical distances between Paris (PAR), London (LON) and Amsterdam (AMS).

For an ingress router REj, in other words for an interface j, Lj denotes the ordered list of the ingress routers REk (interfaces k), from closest to farthest from the interface j.

In this example: L1={1, 2, 3}, L2={2, 1, 3}, L3={3, 2, 1}.

In one embodiment of the disclosed technology, to extend the path associated with a prefix i on an ingress router REk (interface k), this router REk is reconfigured by adding to the attribute AS PATH of the BGP protocol an autonomous system in the list of the autonomous systems to go through to reach the destination subnet SRDi associated with this prefix.

For example, in the example described here, to extend the path associated with the prefix i=1 on the ingress router RE1, the record of the routing table of the ingress router RE1 associated with this prefix can be modified:

SRD1: AS-Path: AS2, AS2, AS3

This configuration can be done by the controller CTR.

In accordance with the BGP protocol, the ingress router REi whose routing table has been modified announces this reconfiguration to the upstream egress router to which it is connected.

In this example, the ingress router RE1 sends to the egress router RS1 two messages of type UPDATE (SRD1, AS2, AS2, AS3).

The egress router RS1 takes note of this attribute change and chooses to route the traffic associated with the destination subnet SRDi (for example here SRD1) to another ingress router of the autonomous system AS2 offering a shorter BGP route towards this destination subnet.

Indeed, in the diagram of FIG. 1, the egress router RS1 has two possibilities to send a packet to the destination subnet SRD1:

either route this packet to the ingress router RE1 that has announced the route AS2, AS2, AS3 (routing distance equal to 3 AS), or route this packet to the egress router RS2 which routes it to the ingress router RE2 that has announced the route AS2, AS2 (routing distance equal to 2 AS)

In this example, the second option which is the shortest will then be chosen.

Using the example of table T1, the effect of extension of the path associated with the prefix i=1, then with the prefix i=2 will be detailed below.

Extension of the Path Associated with the Prefix i=1

Table T2 in the Annex thus illustrates the throughputs at the input of each of the ingress routers RE1, RE2, RE3 assuming that the path associated with the prefix i=1 is extended on the router RE1.

In accordance with the disclosed technology, it is assumed that this path extension has the effect that the traffic associated with the prefix i=1 will be moved on the geographically closest interface, i.e. RE2 (see list L1). Consequently, if this is the case:

the throughput $p_{111}$ associated with the prefix i=1 at the input of the interface j=1 for the time range t=1 becomes 0, the entire associated traffic being routed on the interface 2;

the total throughput $DT_{11}$ is reduced by 3 Gbps;

the throughput $p_{121}$ associated with the prefix i=1 at the input of the interface j=2 which was 10 Gbps in the range t=1 is increased by 3 Gbps and becomes 13 Gbps; the total throughput $DT_{21}$ is also increased by 3 Gbps;

the throughput $p_{112}$ associated with the prefix i=1 at the input of the interface j=1 for the time range t=2 becomes 0, the entire associated traffic being routed on the interface 2; the total throughput $DT_{12}$ is reduced by 6 Gbps; the load $C_1$ on the interface 1 is then 87%, below the threshold $c^{max}$;

the throughput $p_{122}$ associated with the prefix i=1 at the input of the interface j=2 which was 20 Gbps in the range t=2 is increased by 6 Gbps and becomes 26 Gbps; the total throughput $DT_{22}$ at the input of the router RE2 is also increased by 6 Gbps and becomes 94 Gbps.

It is seen that the load $C_2$ of the ingress router RE2 of 94% then exceeds the saturation threshold $C^{max}$.

It is now assumed that the path associated with the prefix i=1 is also extended on the ingress router RE2 and that this path extension has the effect that the traffic associated with the prefix i=1 will be moved on the interface geographically closest to RE2, that is to say towards RE3 (see list L1).

Table T3 in the Annex illustrates the throughputs at the input of each of the ingress routers RE1, RE2, RE3 assuming that the throughput associated with the prefix i=1 is extended on the routers RE1 and RE2 and is therefore routed on the ingress router RE3. In particular:

the throughput $p_{121}$ associated with the prefix i=1 at the input of the interface j=2 for the time range t=1 becomes 0, the entire associated traffic being routed on the interface 3; the total throughput $DT_{11}$ is reduced by 13 Gbps;

the throughput $p_{131}$ associated with the prefix i=1 at the input of the interface j=3 which was 2 Gbps in the range t=1 is increased by 13 Gbps and becomes 15 Gbps; the total throughput $DT_{31}$ is also increased by 13 Gbps;

the throughput $p_{122}$ associated with the prefix i=1 at the input of the interface j=2 for the time range t=2 becomes 0, the entire associated traffic being routed on the interface 3; the total throughput $DT_{22}$ is reduced by 26 Gbps; the load $C_1$ on the interface 2 is then 70%, below the threshold $c^{max}$;

the throughput $p_{132}$ associated with the prefix i=1 at the input of the interface j=3 which was 2 Gbps in the range t=3 is increased by 26 Gbps and becomes 28 Gbps; the total throughput $DT_{32}$ at the input of the router RE2 is also increased by 26 Gbps and becomes 96 Gbps.

It is seen that the load $C_3$ of the ingress router RE3 of 94% exceeds the saturation threshold $c^{max}$ of 90%.

In this example, it is not possible to route the ingress traffic on another ingress router of the autonomous system AS2.

Consequently, the extension of the paths associated with the prefix i=1 on the ingress routers RE1, RE2 does not make it possible to avoid the saturation phenomenon addressed by the disclosed technology.

Extension of the Path Associated with the Prefix i=2

Table T4 in the Annex thus illustrates the throughputs at the input of each of the ingress routers RE1, RE2, RE3 assuming that the path associated with the prefix i=2 is extended on the router RE1, and that this traffic is routed to the ingress router RE2. In particular:

the throughput $p_{211}$ associated with the prefix i=2 at the input of the interface j=1 for the time range t=1 becomes 0, the entire associated traffic being routed on the interface 2; the total throughput $DT_{11}$ is reduced by 3 Gbps;

the throughput $p_{221}$ associated with the prefix i=2 at the input of the interface j=2 which was 3 Gbps in the range t=1 is increased by 2 Gbps and becomes 5 Gbps; the total throughput $DT_{21}$ is also increased by 2 Gbps;

the throughput $p_{212}$ associated with the prefix i=2 at the input of the interface j=1 for the time range t=2 becomes 0, the entire associated traffic being routed on the interface 2; the total throughput $DT_{12}$ is reduced by 4 Gbps; the load $C_1$ on the interface 1 is then 89%, below the threshold $c^{max}$;

the throughput $p_{222}$ associated with the prefix i=2 at the input of the interface j=2 which was 3 Gbps in the range t=2 is increased by 4 Gbps and becomes 7 Gbps; the total throughput $DT_{22}$ at the input of the router RE2 is also increased by 4 Gbps and becomes 92 Gbps.

It is seen that that the load $C_2$ of the ingress router RE2 of 92% exceeds the saturation threshold $C^{max}$ of 90%.

It is now assumed that the path associated with the prefix i=2 is also extended on the ingress router RE2 and that this path extension has the effect that the traffic associated with the prefix i=2 is moved on the interface geographically closest to RE2 that is to say towards RE3.

Table T5 in the Annex thus illustrates the throughputs at the input of each of the ingress routers RE1, RE2, RE3 assuming that the throughput associated with the prefix i=2 is extended on the routers RE1 and RE2 and routed on the ingress router RE3. In particular:

the throughput $p_{221}$ associated with the prefix i=2 at the input of the interface j=2 for the time range t=1 becomes 0, the entire associated traffic being routed on the interface 3; the total throughput $DT_{21}$ is reduced by 5 Gbps;

the throughput $p_{231}$ associated with the prefix i=2 at the input of the interface j=3 which was 5 Gbps in the range t=1 is increased by 5 Gbps and becomes 10 Gbps; the total throughput $DT_{31}$ is also increased by 5 Gbps;

the throughput $p_{222}$ associated with the prefix i=2 at the input of the interface j=2 for the time range t=2 becomes 0, the entire associated traffic being routed on the interface 3; the total throughput $DT_{22}$ is reduced by 7 Gbps; the load $C_2$ on the interface 2 is then 85%, below the threshold $c^{max}$;

the throughput $p_{232}$ associated with the prefix i=2 at the input of the interface j=3 which was 5 Gbps in the range t=2 is increased by 7 Gbps and becomes 12 Gbps; the total throughput $DT_{32}$ at the input of the router RE2 is also increased by 7 Gbps and becomes 77 Gbps; the load $C_3$ on the interface 2 is then 85%, below the threshold $c^{max}$.

It is seen that that this load rebalancing by extension of the path associated with the prefix i=2 on the routers RE1 and RE2 leads to a situation in which none of the ingress routers RE1, RE2, RE3 are saturated.

Very advantageously, the configuration method according to the disclosed technology makes it possible to automatically determine a prefix (step E40) and the ingress routers of the autonomous system AS2 on which the paths associated with this prefix must be extended (step E50) so that traffic is rebalanced so that none of these ingress routers are saturated.

In accordance with the disclosed technology, this determination is done by optimizing an objective function FOBJ in compliance with a set of constraints.

In the embodiment described here, the optimization of the objective function FOBJ consists in minimizing the number of ingress routers (or interfaces) to be reconfigured.

In the embodiment described here, the optimization function meets 5 constraints:

the first constraint CST1 imposes that the traffic associated with a prefix i is routed on one and only one ingress router;

the second constraint CST2 prohibits triggering the routing of the traffic associated with a prefix i towards an ingress router REk while extending the path associated with this prefix on this ingress router;

the third constraint CST3 imposes that if the traffic associated with a prefix i is switched from an ingress router REj to an ingress router REk, then the path associated with this prefix must be extended on all the ingress routers classified between these two routers REj (included) and REk (excluded) in the list Lj;

the fourth constraint CST4 imposes that, whatever the time range t, all the incoming traffic on an ingress router REj must not exceed the saturation threshold $C^{max}$; and the fifth constraint CST5 imposes that if at least one path associated with a prefix on an ingress router is extended, then this ingress router must be reconfigured.

In one embodiment of the disclosed technology, this optimization is implemented by the execution of a linear program, the objective function as well as the constraints being expressed in the form of linear functions with respect to decision variables.

In one embodiment, the following notations are introduced:

$p_{ijt}$: peak traffic associated with the prefix i on the interface j during a time period t.

Lj: ordered list of the ingress routers of the first autonomous system from closest to farthest from the saturated router REj.

L(j,k): sub-list of Lj comprising the ingress routers of the first autonomous system which are geographically closer to the saturated router REj than said target router REk.

$x_{ijk}$: binary decision variable equal to 1 if the traffic associated with the prefix i is rerouted from the interface j to the interface k, 0 if not;

$y_{ij}$ is a binary decision variable equal to 1 if the prefix i has its path extended on the interface j, 0 if not.

$z_j$ is a binary decision variable equal to 1 if the interface j is reconfigured, 0 if not.

The following notations are introduced:

$c^{max}$ is a saturation threshold and $b_j$ is the maximum throughput supported by the router REj.

$x_{ijk}$ is a binary decision variable equal to 1 if the traffic associated with the prefix i is routed from a router REi to a router REj, 0 if not;

$y_{ij}$ is a binary decision variable equal to 1 if the path associated with the prefix i is extended on an ingress router REj, 0 if not;

$z_j$ is a binary decision variable equal to 1 if the ingress router REi is reconfigured, 0 if not.

With these notations:

the objective function FOBJ consisting in minimizing the number of ingress routers (or interfaces) to be reconfigured is expressed:

FOBJ: Min $\Sigma_{j \in J} z_j$ the 5 constraints CST1 to CST5 are expressed:

| | |
|---|---|
| CST1: $\Sigma_{k \in J} x_{ijk} = 1$ | $\forall i \in I, \forall j \in J$ |
| CST2: $x_{ijk} + y_{ik} \leq 1$ | $\forall i \in I, \forall j \in J, \forall k \in J$ |
| CST3: $x_{ijk} \leq y_{il}$ | $\forall i \in I, \forall j \in J, \forall k \in J, \forall l \in L(j, k)$ |
| CST4: $\Sigma_{i \in I} \Sigma_{j \in J} p_{ijt} x_{ijk} \leq c^{max} b_k$ | $\forall k \in J, \forall t \in T$ |
| CST5: $y_{ij} \leq z_j$ | $\forall i \in I, \forall j \in J$ |

In one embodiment of the disclosed technology, the optimization of the objection function FOBJ in compliance with the linearized constraints CST1 to CST5 such as above can for example be implemented by a CPLEX solver version 12.56 published by IBM (registered trademark), or by a CBC (Coin- or Branch and Cut) solver distributed at the address https://www.coin-or.org/Cbc.

The optimization method provides the prefix i and the interfaces j (or ingress routers REj) for which the path associated with this prefix i must be extended.

In the embodiment described here, and as mentioned previously, the extension of a path associated with a prefix i on an ingress router REk (step E50) includes:

a reconfiguration of this router by adding at least one autonomous system to an AS-Path attribute of the BGP protocol; and a sending of said attribute to the egress routers of the upstream autonomous system.

In the embodiment described here, with reference to FIG. 1, the optimization unit OPT has the hardware architecture of a computer. It includes in particular a processor 10, a random access memory 11, a read-only memory 12 and communication means 13.

The read-only memory 12 constitutes a recording medium within the meaning of the disclosed technology. It includes a computer program PG in accordance with the disclosed technology.

This computer program PG includes instructions for executing the following steps when said program is executed by a computer.

obtaining, from the collection device DC, information according to which the traffic received by an ingress router of a first autonomous system is saturated;

determining a prefix of a destination subnet of an autonomous system downstream of said first autonomous system;

sending an instruction to extend the path associated with said prefix on at least one target router among the ingress routers of said first autonomous system.

This instruction can for example be sent to the controller CTR so that it extends the path associated with the prefix i on an ingress router of the autonomous system.

In one particular embodiment, the computer program PG implements the integer linear program ILP described previously to determine the prefix and the routers to be reconfigured.

ANNEX

TABLE T1

| $p_{ijt}$ (Gbps) | | interface j = 1 | interface j = 2 | interface j = 3 |
|---|---|---|---|---|
| Time | prefix i = 1 | $p_{111} = 3$ | $p_{121} = 10$ | $p_{131} = 2$ |
| range | prefix i = 2 | $p_{211} = 2$ | $p_{221} = 3$ | $p_{231} = 5$ |
| t = 1 | $DT_{j1}$ | $DT_{11} = 80$ | $DT_{21} = 80$ | $DT_{31} = 80$ |
| Time | prefix i = 1 | $p_{112} = 6$ | $p_{122} = 20$ | $P_{132} = 2$ |
| range | prefix i = 2 | $p_{212} = 4$ | $p_{222} = 3$ | $p_{232} = 5$ |
| t = 2 | $DT_{j2}$ | $DT_{12} = 93$ | $DT_{22} = 88$ | $DT_{32} = 70$ |
| | Load Cj | $C_1 = 93\%$ | $C_2 = 88\%$ | $C_3 = 80\%$ |

TABLE T2

| $p_{ijt}$ (Gbps) | | interface j = 1 | interface j = 2 | interface j = 3 |
|---|---|---|---|---|
| Time | prefix i = 1 | $p_{111} = 0$ | $p_{121} = 13$ | $p_{131} = 2$ |
| range | prefix i = 2 | $p_{211} = 2$ | $p_{221} = 3$ | $p_{231} = 5$ |
| t = 1 | $DT_{j1}$ | $DT_{11} = 77$ | $DT_{21} = 83$ | $DT_{31} = 80$ |
| Time | prefix i = 1 | $p_{112} = 0$ | $p_{122} = 26$ | $P_{132} = 2$ |
| range | prefix i = 2 | $p_{212} = 4$ | $p_{222} = 3$ | $p_{232} = 5$ |
| t = 2 | $DT_{j2}$ | $DT_{12} = 87$ | $DT_{22} = 94$ | $DT_{32} = 70$ |
| | Load Cj | $C_1 = 87\%$ | $C_2 = 94\%$ | $C_3 = 80\%$ |

TABLE T3

| $p_{ijt}$ (Gbps) | | interface j = 1 | interface j = 2 | interface j = 3 |
|---|---|---|---|---|
| Time | prefix i = 1 | $p_{111} = 0$ | $p_{121} = 0$ | $p_{131} = 15$ |
| range | prefix i = 2 | $p_{211} = 2$ | $p_{221} = 3$ | $p_{231} = 5$ |
| t = 1 | $DT_{j1}$ | $DT_{11} = 77$ | $DT_{21} = 70$ | $DT_{31} = 93$ |
| Time | prefix i = 1 | $p_{112} = 0$ | $p_{122} = 0$ | $P_{132} = 28$ |
| range | prefix i = 2 | $p_{212} = 4$ | $p_{222} = 3$ | $p_{232} = 5$ |
| t = 2 | $DT_{j2}$ | $DT_{12} = 87$ | $DT_{22} = 68$ | $DT_{32} = 96$ |
| | Load Cj | $C_1 = 87\%$ | $C_2 = 70\%$ | $C_3 = 80\%$ |

TABLE T4

| $p_{ijt}$ (Gbps) | | interface j = 1 | interface j = 2 | interface j = 3 |
|---|---|---|---|---|
| Time | prefix i = 1 | $p_{111} = 3$ | $p_{121} = 10$ | $p_{131} = 2$ |
| range | prefix i = 2 | $p_{211} = 0$ | $p_{221} = 5$ | $p_{231} = 5$ |
| t = 1 | $DT_{j1}$ | $DT_{11} = 78$ | $DT_{21} = 82$ | $DT_{31} = 80$ |
| Time | prefix i = 1 | $p_{112} = 6$ | $p_{122} = 20$ | $P_{132} = 2$ |
| range | prefix i = 2 | $p_{212} = 0$ | $p_{222} = 7$ | $p_{232} = 5$ |
| t = 2 | $DT_{j2}$ | $DT_{12} = 89$ | $DT_{22} = 92$ | $DT_{32} = 70$ |
| | Load Cj | $C_1 = 89\%$ | $C_2 = 92\%$ | $C_3 = 80\%$ |

TABLE T5

| $p_{ijt}$ (Gbps) | | interface j = 1 | interface j = 2 | interface j = 3 |
|---|---|---|---|---|
| Time | prefix i = 1 | $p_{111} = 3$ | $p_{121} = 10$ | $p_{131} = 2$ |
| range | prefix i = 2 | $p_{211} = 0$ | $p_{221} = 0$ | $p_{231} = 10$ |
| t = 1 | $DT_{j1}$ | $DT_{11} = 78$ | $DT_{21} = 77$ | $DT_{31} = 85$ |
| Time | prefix i = 1 | $p_{112} = 6$ | $p_{122} = 20$ | $P_{132} = 2$ |
| range | prefix i = 2 | $p_{212} = 0$ | $p_{222} = 0$ | $p_{232} = 12$ |
| t = 2 | $DT_{j2}$ | $DT_{12} = 89$ | $DT_{22} = 85$ | $DT_{32} = 77$ |
| | Load Cj | $C_1 = 89\%$ | $C_2 = 85\%$ | $C_3 = 85\%$ |

TABLE TD

|       | PAR     | LON     | AMS     |
|-------|---------|---------|---------|
| PAR   | 0       | 345 km  | 357 km  |
| LON   | 345 km  | 0       | 355 km  |
| AMS   | 357 km  | 355 km  | 0       |

The invention claimed is:

1. A method for configuring a first autonomous system in a transit network, the method including:

obtaining information according to which traffic received by an ingress router of said first autonomous system is saturated, said traffic being received from at least one egress router of a second autonomous system upstream of said first autonomous system;

determining a prefix of a destination subnet of a third autonomous system downstream of said first autonomous system, at least part of said traffic being destined for equipment of said destination subnet;

extending a path associated with said prefix on at least one target router among ingress routers of said first autonomous system, said prefix and said at least one target router being determined by optimizing an objective function in compliance with at least these constraints, according to which:

(i) for any ingress router of the first autonomous system, the traffic at the input of said router is below a saturation threshold; and (ii) the path associated with said prefix must be extended for all the ingress routers of the first autonomous system which are geographically closer to the saturated router than said target router.

2. The method of claim 1, wherein extending the path associated with said prefix on at least one said target router includes:

reconfiguring a routing table of said target router by adding at least one autonomous system to an AS-Path attribute of the BGP protocol; and sending said attribute to at least one egress router of said second upstream autonomous system.

3. The method of claim 1, wherein optimizing the objective function comprises minimizing a number of ingress routers to be reconfigured.

4. The method of claim 1, wherein optimizing the objective function comprises minimizing a number of prefixes whose path is extended, or in minimizing a load of the most loaded interface.

5. The method of claim 1, wherein:

said objective function is a linear function of the form:
$$\text{Min} \sum_{j \in J} z_j, \text{ and}$$

said constraints are linearly expressed in the form:

| | |
|---|---|
| CST1: $\sum_{k \in J} x_{ijk} = 1$ | $\forall i \in I, \forall j \in J$ |
| CST2: $x_{ijk} + y_{ik} \leq 1$ | $\forall i \in I, \forall j \in J, \forall k \in J$ |
| CST3: $x_{ijk} \leq y_{il}$ | $\forall i \in I, \forall j \in J, \forall k \in J, \forall l \in L(j, k)$ |
| CST4: $\sum_{i \in I} \sum_{j \in J} p_{ijt} x_{ijk} \leq c^{max} b_k$ | $\forall k \in J, \forall t \in T$ |
| CST5: $y_{ij} \leq z_j$ | $\forall i \in I, \forall j \in J$ | wherein:

$c^{max}$ is a saturation threshold and $b_j$ is a maximum throughput supported by the saturated router;

$p_{ijt}$ is a peak traffic associated with the prefix i on an interface j during a time range t;

Lj is an ordered list of the ingress routers of the first autonomous system from closest to farthest from the saturated router;

L(j,k) is a sub-list of Lj comprising the ingress routers of the first autonomous system which are geographically closer to the saturated router than said target router;

$x_{ijk}$ is a binary decision variable equal to 1 if the traffic associated with the prefix i is routed from an ingress router to a target router, and equal to 0 if the traffic associated with the prefix i is not routed from an ingress router to a target router;

$y_{ij}$ is a binary decision variable equal to 1 if the path associated with the prefix i is extended on an ingress router, and equal to 0 if the path associated with the prefix i is not extended on an ingress router; and $z_j$ is a binary decision variable equal to 1 if the ingress router is reconfigured, and equal to 0 if the ingress router is not reconfigured.

6. A system for configuring a first autonomous system in a transit network, the system including:

an optimization unit configured to obtain information according to which traffic received by an ingress router of a first autonomous system is saturated, said traffic being received from at least one egress router of a second autonomous system upstream of said first autonomous system, said optimization unit being configured to determine a prefix of a destination subnet of a third autonomous system downstream of said first autonomous system, at least part of said traffic being destined for equipment of said destination subnet;

a control unit configured to extend a path associated with said prefix on at least one target router among ingress routers of said first autonomous system, said prefix and said at least one target router being determined by said optimization unit by optimizing an objective function in compliance with at least these constraints, according to which:

(i) for any ingress router of the first autonomous system, the traffic at the input of said router is below a saturation threshold; and (ii) the path associated with said prefix must be extended for all the ingress routers of the first autonomous system which are geographically closer to the saturated router than said target router.

7. A non-transitory computer readable medium having stored thereon instructions which when executed by a processor, cause the processor to implement the steps of:

obtaining information according to which traffic received by an ingress router of a first autonomous system is saturated, said traffic being received from at least one egress router of a second autonomous system upstream of said first autonomous system;

determining a prefix of a destination subnet of a third autonomous system downstream of said first autonomous system, at least part of said traffic being destined for equipment of said destination subnet; and sending an instruction to extend a path associated with said prefix on at least one target router among ingress routers of said first autonomous system, said prefix and said at least one target router REk being determined by optimizing an objective function in compliance with at least these constraints, according to which:

(i) for any ingress router of the first autonomous system, the traffic at the input of said router is below a saturation threshold; and (ii) the path associated with said prefix must be extended for all the ingress routers of the first autonomous system which are geographically closer to the saturated router than said target router.

* * * * *